June 14, 1955   P. B. WHITAKER   2,710,762
TAPER SHEAVE AND BUSHING ASSEMBLY
Filed Oct. 26, 1949

INVENTOR.
Paul B. Whitaker
BY
ATTORNEY

United States Patent Office 2,710,762
Patented June 14, 1955

2,710,762

TAPER SHEAVE AND BUSHING ASSEMBLY

Paul B. Whitaker, Denver, Colo., assignor to The Electron Corp., Denver, Colo., a corporation of Colorado Application October 26, 1949, Serial No. 123,572

2 Claims. (Cl. 287—52.06)

This invention relates to new and useful improvements in sheaves, pulleys and the like, and an important object of the invention is to provide constructions whereby the sheave or the like, will stay tight, run true and can be mounted in two different ways by fastening means which can be inserted into either side of the sheave.

Another object of the invention is to employ a split tapered bushing with cap screws which are tightened to draw the bushing into the sheave hub or to draw the sheave hub upon the bushing to wedge the tapered surfaces and compress the bushing evenly until it grips the entire circumference of the shaft. This gripping action uniformly around the entire circumference of the shaft, produces a tight fit without wobble or eccentricity even on shafts that are slightly oversize or undersize.

Since the web or spoke portion of the sheave is positioned centrally with respect to the rim or sheave grooves, and the bushing itself is offset, the sheave can be mounted in either of two positions—partially over the bearing, which reduces overhang and hence the stress upon the bearing—or in the reverse position if desired or required. By reason of a special arrangement of tapped openings and counter-bored clearance holes in both the sheave and bushing, no matter which mounting position is selected, the cap screws can be inserted in the side of the sheave which is easiest to reach. Moreover, whatever mounting position is employed, there will always be a pair of tapped or jack holes in the side of the sheave easiest to reach, thereby facilitating removal of the sheave, either as an assembly with the bushing, or separately from the bushing.

These and other objects of the invention will become apparent during the course of the following description.

In the accompanying drawing forming a part of the description, and wherein like numerals are employed to designate like parts throughout the various views, Fig. 1 is a perspective view of a preferred embodiment of the invention in one of its positions, with a segment thereof removed and sectioned to illustrate the construction;

Figure 1:
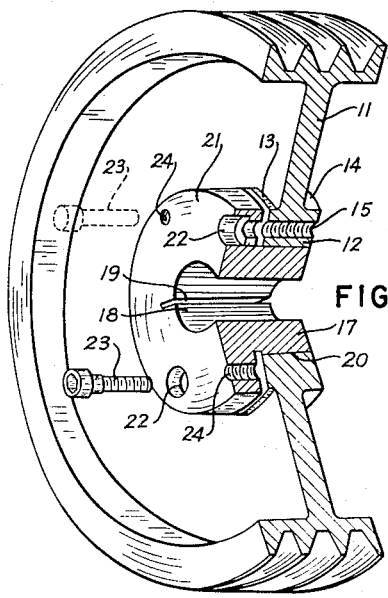

Referring now more particularly to the drawing, wherein is shown a few embodiments of the invention which are at present preferred for the purposes of illustration but not of limitation, the numeral 10 designates a three groove rim of a power transmission member, such as a sheave member having an integral spoke or web portion 11 arranged centrally of the rim in a plane at right angles thereto. The web portion 11 is provided with a hub 12 formed by a relatively narrow flange 13 on one side of the web and a relatively wider flange 14 on the other side thereof to form a relatively wide hub with an extended bearing surface or bore which is tapered approximately one-sixteenth of an inch per inch from its larger end adjacent the narrower flange 13 to a smaller diameter adjacent the larger or wider flange 14, as shown. This additional width also provides for greater footing for a pair of diametrically opposed tapped jack openings 15 and a pair of diametrically disposed counter-bored clearance openings 16 extending through the hub in planes parallel to the axis thereof. These two pairs of openings are set apart approximately thirty degrees to forty-five degrees, or in other words, diametrical lines joining the respective pairs of openings define such angles for a purpose to be presently described.

A bushing member 17 has the usual bore 18 to receive a shaft, provided with a radially extending slit 19 extended lengthwise of the bore and partly through the thickness of its hollow tubular body to render it elastically yieldable for gripping the shaft. The outer surface 20 of the bushing body is tapered to mate and slide upon the tapered surface of the sheave hub to wedge thereon and cause a frictional grip between, not only the shaft and bushing, but also between the bushing and sheave hub. One end of the bushing, near the largest end of the tapered surface 20, is provided with a radially extending flange or head 21 of about the same radius as the flanges 13 and 14 of the sheave, to be arranged adjacent the sheave flange 13 in one position of the sheave, as shown in Fig. 1, when the bushing forms the outermost member; or is arranged adjacent the same flange 13 when the sheave and bushing are reversed end for end, as shown in Fig. 2, for the second position of the sheave when the latter constitutes the outermost member and the flange 21 of the bushing is arranged innermost.

Like the sheave hub, the head 21 of the bushing 17 is provided with a pair of diametrically opposed counter-bored clearance openings 22, which in the position shown in Fig. 1, align with the tapped openings 15 in the sheave hub, to receive cap screws 23 which serve to draw the tapered hub of the sheave more firmly upon the tapered surface 20 of the bushing to compress the slit bushing upon the shaft. The head of the bushing is also provided with a pair of tapped jack openings 24 at diametrically opposite points, which, when the parts are in the position shown in Fig. 1, do not align with the counter-bored openings 16 in the sheave hub, but are opposite to imperforate portions thereof; so that when desired to separate the bushing from the sheave, the cap screws 23 are removed from the counter-bored openings 22 of the bushing and are threaded into the jack openings 24 and tightened to bear or thrust against the imperforate portions of the sheave hub to withdraw the bushing from the sheave. The tapped openings 15 of the sheave and 24 of the bushing are termed "jack" openings, because they serve the cap screws to render them jacks in jacking or thrusting the outer member away from the inner member of the combination, when separation of the two members is desired. These two pairs of openings 22 and 24 in the bushing flange 21, like corresponding pairs of openings in the sheave, are set apart similarly to the latter, so that when the parts are reversed in position as shown from Fig. 1 to the position shown in Fig. 2, and the sheave and bushing are rotated relatively slightly, the tapped openings 15 in the sheave hub will be disposed opposite imperforate portions of the bushing head or flange for the thrust of the cap screws in separating the two members, and will also be spaced sufficiently from the counter-bored openings 22 so as not to weaken the structure. While two pairs of openings are illustrated for each of the bushing and sheave, it will be understood that additional counter-bored and tapped openings may be provided as desired. When the sheave and bushing are positioned as shown in Fig. 2, the counter-bored openings 16 of the sheave are aligned with the tapped openings 24 of the bushing, so that when the cap screws 23 are inserted therein and turned down, the sheave hub is forced up the tapered surface of the bushing as the latter is compressed uniformly and tightly about the shaft. In this position, the assembly is well adapted to short, undersize or oversize shafts to reduce overhang stress, and since the taper runs toward the outside, the sheave may be demounted more easily and quickly. In both of the two positions of the sheave, the device can be aligned as a complete assembly, as is obvious.

Figure 2:
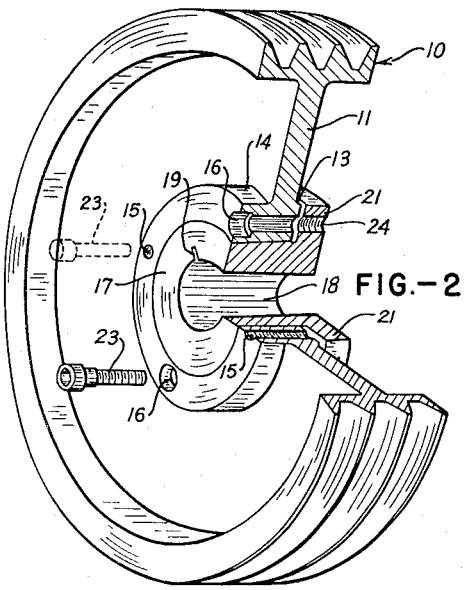
Fig. 2 is a similar view showing the invention in another of its positions, with the flange or head of the bushing disposed innermost of the assembly, especially when used on short, undersize or oversize shafts.
Figure 3:
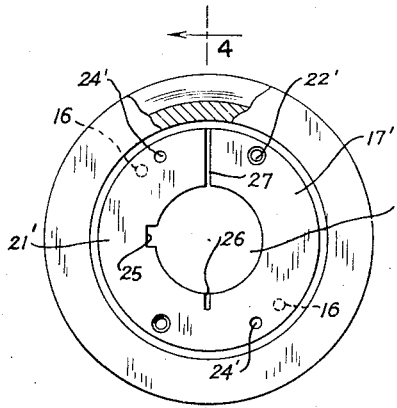
Fig. 3 is a plan view of a modified form of bushing shown in the preceding figures.
Figure 4:
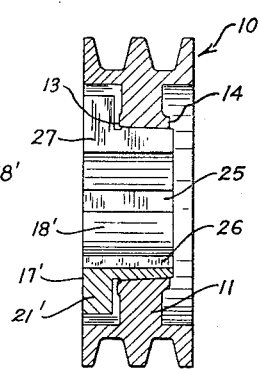
Fig. 4 is a vertical section taken on the line 4—4 of Fig. 3.

In Figs. 3 to 7 inclusive, various modifications of slits and arrangements thereof are illustrated for the bushing shown in Figs. 1 and 2, and corresponding parts in all of the figures are designated with corresponding numerals which are primed in Figs. 3 to 7. The bore 18' of the bushing in Figs. 3 and 4 is provided with a key-way 25 and also two diametrically disposed slits 26 and 27 to increase resilient flexibility of the bushing; the slit 26 extending the entire length of the tapered bore 18' but being only of a depth extending part way through the thickness of the bushing body, while the slit 27 also runs the entire length of the bore and extends through the entire thickness of both the tapered body 17' and the radial head or flange 21', as best illustrated in Fig. 4.

Figure 5:
Fig. 5 is a plan of another modified form of bushing.
Figure 6:
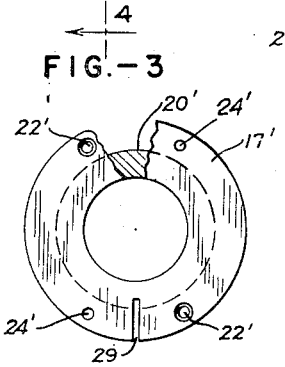
Fig. 6 is a plan view of still another modification of the bushing, with a portion thereof broken away.
Figure 7:
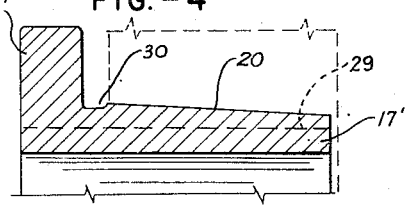
Fig. 7 is an enlarged longitudinal section of a half of the bushing with the taper thereof exaggerated.

In Fig. 5 the slit 28 in the bushing is the same as 27 in the preceding two Figs. 3 and 4, and this form omits the second slit 26; otherwise the bushing is the same as illustrated in Figs. 1 and 2. Fig. 6 also shows only one slit 29 which extends the entire length of the body 17' from the outer tapered surface 20', but not entirely through the thickness thereof. Fig. 7 shows an enlarged section of the bushing 17' with the tapered surface exaggerated for clarity and it terminating short of the head or flange 21' as indicated at 30. In this figure, the slit 29 is illustrated to better advantage.

In the foregoing description reference has been made to the arrangement and functioning of the threaded, counter-bored openings in which the cap screws 23 are fitted. I have shown and prefer to use screws having a socket-type head member that fits into the counter-bored opening to the depth of such head. However, it will be preferable under some conditions to use cap screws having a hex head and in such event the provision of a counter-sink will be unnecessary. Since the two types of fastening are mechanical equivalents the term counter-bored opening as used in this specification is intended to apply to other types of openings which can be used to perform the function of the counter-bored openings shown in the drawings.

While the most common application of the novel features of the present invention is in the sheave and pulley art, it will be apparent that the same assembly relationship may be included in flexible couplings and similar devices which are not sheaves or pulleys within the usual meaning of those terms.

From the foregoing description the various uses and advantages of the invention will be apparent to those skilled in the art, and it is to be understood that various changes in the size, shape and arrangement of parts may be made, without departing from the scope of the appended claims.

I claim:

1. A rotary assembly for mounting on a shaft comprising: a hub member having a tapered bore; a contractible bushing having a shaft-engaging inner bore, a tapered outer surface portion fitting said hub member bore, and a circumferential flange at the larger end of said outer surface portion overlying an end face of said hub member; means defining at least one clearance hole extending through said flange parallel to the axis thereof; means defining at least one threaded opening extending through said hub member in alignment with said flange opening; a cap screw extending through said flange opening and into engagement with said hub member threaded opening for drawing said hub member and said bushing into wedging engagement to contract the latter about a shaft; means defining at least one threaded opening engageable by said screw and extending through said flange parallel to and in circumferentially-spaced relation to said flange clearance opening; and means defining at least one clearance opening extending through said hub member parallel to the axis thereof out of alignment with said flange threaded opening but alignable therewith by relative rotation between said hub member and said bushing on removal of said screw, whereby said screw can be withdrawn and threaded through said flange threaded opening to jack said hub member and said bushing apart, said hub member clearance opening can be aligned with said flange threaded opening, and said screw can extend through said hub member clearance opening and into engagement with said flange clearance opening to draw said hub member and said bushing into wedging engagement, and said screw can be withdrawn and threaded into said hub member threaded opening to jack said hub member and said bushing apart.

2. A rotary assembly for mounting on a shaft comprising: a hub member having a tapered bore; a contractible bushing having a shaft-engaging inner bore, a tapered outer surface portion fitting said hub member bore, and a circumferential flange at the larger end of said hub member; means defining at least two pairs of alignable openings extending through said hub member and said flange parallel to the axis of the assembly, the openings of one pair consisting of a clearance opening in said flange and a threaded opening in said hub member and the openings of the other pair consisting of a clearance opening in said hub member and a threaded opening in said flange, the openings of one pair being out of alignment when the openings of the other pair are aligned; and a cap screw alternatively receivable through the clearance and into the threaded openings of each pair when aligned to draw said hub member and said bushing into wedging engagement, said screw also being threadable into the threaded opening of a misaligned pair to jack said hub member and said bushing apart.

References Cited in the file of this patent

UNITED STATES PATENTS

| | | |
|---|---|---|
| Re. 22,485 | Otto | May 23, 1944 |
| 2,331,498 | Otto | Oct. 12, 1943 |
| 2,377,046 | Siegerist | May 29, 1945 |
| 2,381,697 | Shepard | Aug. 7, 1945 |
| 2,407,032 | Myers | Sept. 3, 1946 |
| 2,460,631 | Fawick | Feb. 1, 1949 |
| 2,482,662 | Dunne | Sept. 20, 1949 |
| 2,487,128 | Hahn | Nov. 8, 1949 |